United States Patent
Tang

(10) Patent No.: US 9,094,776 B2
(45) Date of Patent: Jul. 28, 2015

(54) METHOD AND APPARATUS FOR PROGRESSIVELY SCANNING CHANNELS

(75) Inventor: Sung Chien Tang, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 869 days.

(21) Appl. No.: 12/507,963

(22) Filed: Jul. 23, 2009

(65) Prior Publication Data

US 2010/0240333 A1    Sep. 23, 2010

(30) Foreign Application Priority Data

Mar. 23, 2009    (TW) ............................... 98109329 A

(51) Int. Cl.
*H04B 1/18* (2006.01)
*H04W 8/00* (2009.01)
*H04W 48/16* (2009.01)

(52) U.S. Cl.
CPC .............. *H04W 8/005* (2013.01); *H04W 48/16* (2013.01)

(58) Field of Classification Search
CPC ................... H03J 3/00–3/32; H03J 7/18–7/32; H03J 1/0058–1/0091; H03J 5/0263; H03J 5/0281
USPC ........................ 455/161.1–169.2, 450, 452.1, 455/179.1–180.2, 434
See application file for complete search history.

(56) References Cited

U.S. PATENT DOCUMENTS

| 4,509,203 | A  | * | 4/1985  | Yamada ..................... 455/166.2 |
| 4,516,272 | A  | * | 5/1985  | Yano .............................. 398/58 |
| 7,864,744 | B2 | * | 1/2011  | Song et al. .................... 370/341 |
| 7,907,564 | B2 | * | 3/2011  | Laux et al. .................... 370/329 |
| 8,310,938 | B2 | * | 11/2012 | Espina Perez et al. ....... 370/241 |
| 2005/0026610 | A1 | * | 2/2005 | Backes et al. ................ 455/434 |
| 2005/0245269 | A1 | * | 11/2005 | Demirhan et al. ......... 455/452.1 |
| 2006/0128382 | A1 | * | 6/2006 | Kim ............................ 455/434 |
| 2008/0014934 | A1 | * | 1/2008 | Balasubramanian et al. 455/434 |
| 2009/0054062 | A1 | * | 2/2009 | Bamburak et al. ........... 455/434 |
| 2010/0097951 | A1 | * | 4/2010 | Espina Perez et al. ....... 370/252 |

FOREIGN PATENT DOCUMENTS

CN    1925683 A    3/2007

OTHER PUBLICATIONS

Office Action issued on Dec. 7, 2011 from the Chinese counterpart application 200910132621.4.

* cited by examiner

*Primary Examiner* — Edward Urban
*Assistant Examiner* — Rui Hu
(74) *Attorney, Agent, or Firm* — WPAT, P.C.; Anthony King; Kay Yang

(57) ABSTRACT

A method for progressively scanning channels first checks whether all channel scanning tasks are completed so as to determine a channel that will be scanned first. During the scanning process, the method records a channel as a last scanned channel after completing a channel scanning task for the channel. In addition, the method scans a channel with a valid service set identifier to increase the possibility of detecting hidden access points.

13 Claims, 4 Drawing Sheets

METHOD AND APPARATUS FOR PROGRESSIVELY SCANNING CHANNELS

BACKGROUND OF THE INVENTION

1. Field of the Invention

The present invention relates to a communication system, and more particularly, to a method and apparatus for progressively scanning channels.

2. Description of the Related Art

Wireless local area network (WLAN) technology is now popularly used in various applications. Numerous organizations devote extensive resources to research, seeking improvements in WLAN data communication quality. In a WLAN, a wireless transmit/receive unit (WTRU) may be located within communication ranges of several access points (APs). However, the AP associated with the WTRU and the channel the WTRU operates on may change over time due to signal strength variations. Before the WTRU can be associated with an AP, a handoff procedure has to be performed. The handoff procedure includes a scanning phase, an authentication phase and a re-association phase, with the scanning phase incurring significant delay. For example, a dual-band station which could operate on 38 different channels (channels 1-14, channel 36, channel 40, channel 44, channel 48, channel 52, channel 56, channel 60, channel 64, channel 100, channel 104, channel 108, channel 112, channel 116, channel 120, channel 124, channel 128, channel 132, channel 136, channel 140, channel 149, channel 153, channel 157, channel 161, channel 165) that requires 140 ms to scan each channel. Such a dual-band station would need 5320 ms to scan all the channels. However, if the operating system used for the dual-band station is Microsoft Windows XP, after running a channel scanning procedure for approximately 3 seconds, the operating system interrupts the scanning procedure automatically. Thus, the dual-band station can not complete the procedure of scanning all channels. The dual-band station is unable to connect with an AP if the channel the AP operates on is not scanned by the dual-band station.

FIG. 1 illustrates a diagram for a scanning procedure performed by a station. An operating system issues a scan request to a wireless device driver of a station. The wireless device driver deletes all previous channel scanning results and then starts scanning from channel 1. As above, after running the channel scanning procedure for approximately 3 seconds, the operating system interrupts the scanning procedure automatically and issues a listing request. Therefore, the scanning procedure can only complete the scanning of channels 1 to 64. Because the wireless device driver deletes all previous channel scanning results before beginning a scanning operation and then starts scanning from channel 1, only some channels, channels 1 to 64 in this case, are scanned for every single channel scanning procedure. In other words, the station is unable to connect to an AP operating on another channel (for example, channel 153) which is not scanned yet.

SUMMARY OF THE INVENTION

The progressive channel scanning method in accordance with the present invention first checks whether all channel scanning tasks are completed. If they are, the progressive channel scanning procedure is started from a start-up channel. Before scanning a channel, the scanning result of the channel in a channel scanning record is deleted, wherein the scanning result is obtained from the previous scanning operation for the channel. During the scanning process, a channel is recorded as a last scanned channel after completing a channel scanning task for the channel. If only some channel scanning tasks are completed in the previous channel scanning procedure, the apparatus continuously scans channels from the channel next to the last scanned channel. In addition, the method scans a channel with a valid service set identifier (SSID) to increase the possibility of detecting hidden APs.

One embodiment of the present invention discloses a progressive channel scanning method comprising the steps of: checking whether a channel scanning procedure is completed and obtaining a scanning instruction; setting a channel to be scanned in accordance with the scanning instruction; deleting a record of the channel to be scanned if the record of the channel to be scanned is recorded in a scanning record; and scanning the channel to be scanned.

Another embodiment of the present invention discloses a progressive channel scanning apparatus comprising a setting unit, a scanning unit, a recording unit and a checking unit. The setting unit is utilized for setting a channel to be scanned. The scanning unit is utilized for scanning the channel to be scanned. The recording unit is utilized for recording at least one scanning result from the scanning unit in a scanning record and recording the channel to be scanned as a last scanned channel. The checking unit is utilized for checking the at least one result recorded in the recording unit and determining a next channel to be scanned.

BRIEF DESCRIPTION OF THE DRAWINGS

The invention will be described according to the appended drawings in which.

PREFERRED EMBODIMENT OF THE PRESENT INVENTION

Figure 1:
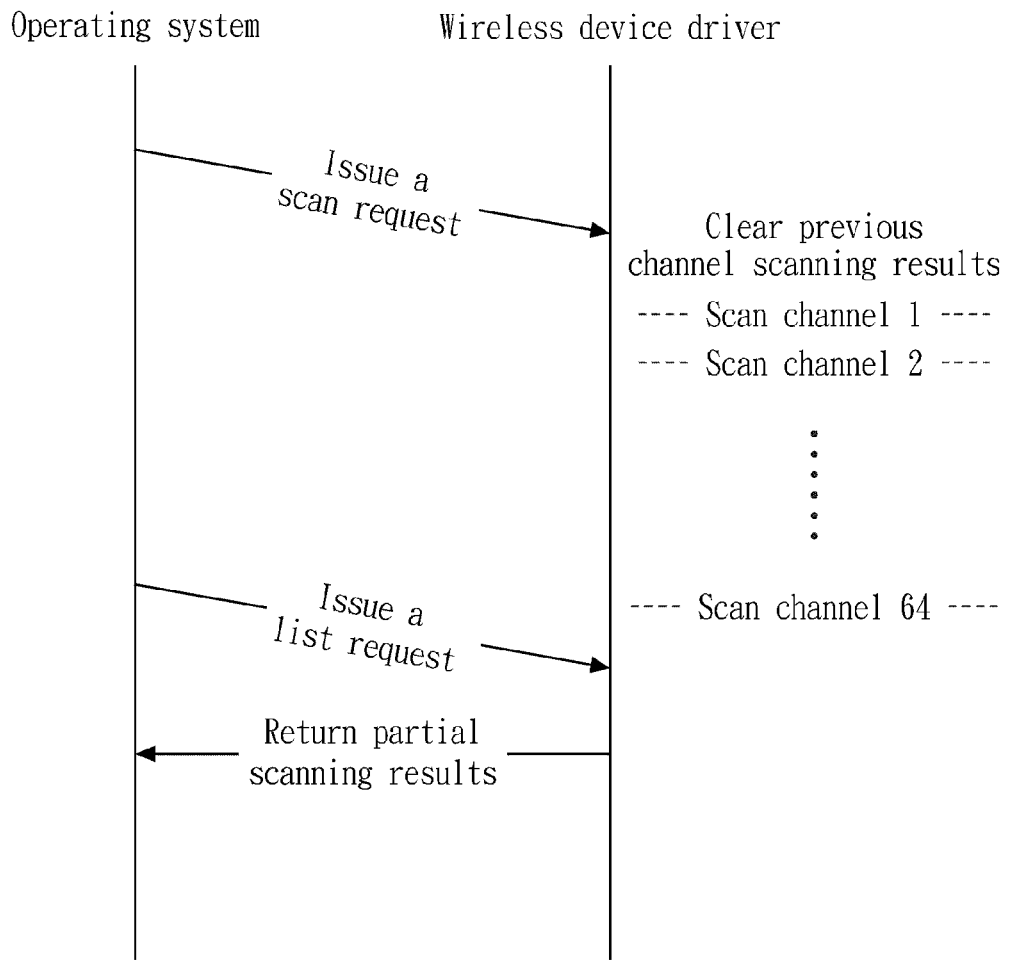
FIG. 1 illustrates a diagram for a scanning procedure performed by a station.
Figure 2:
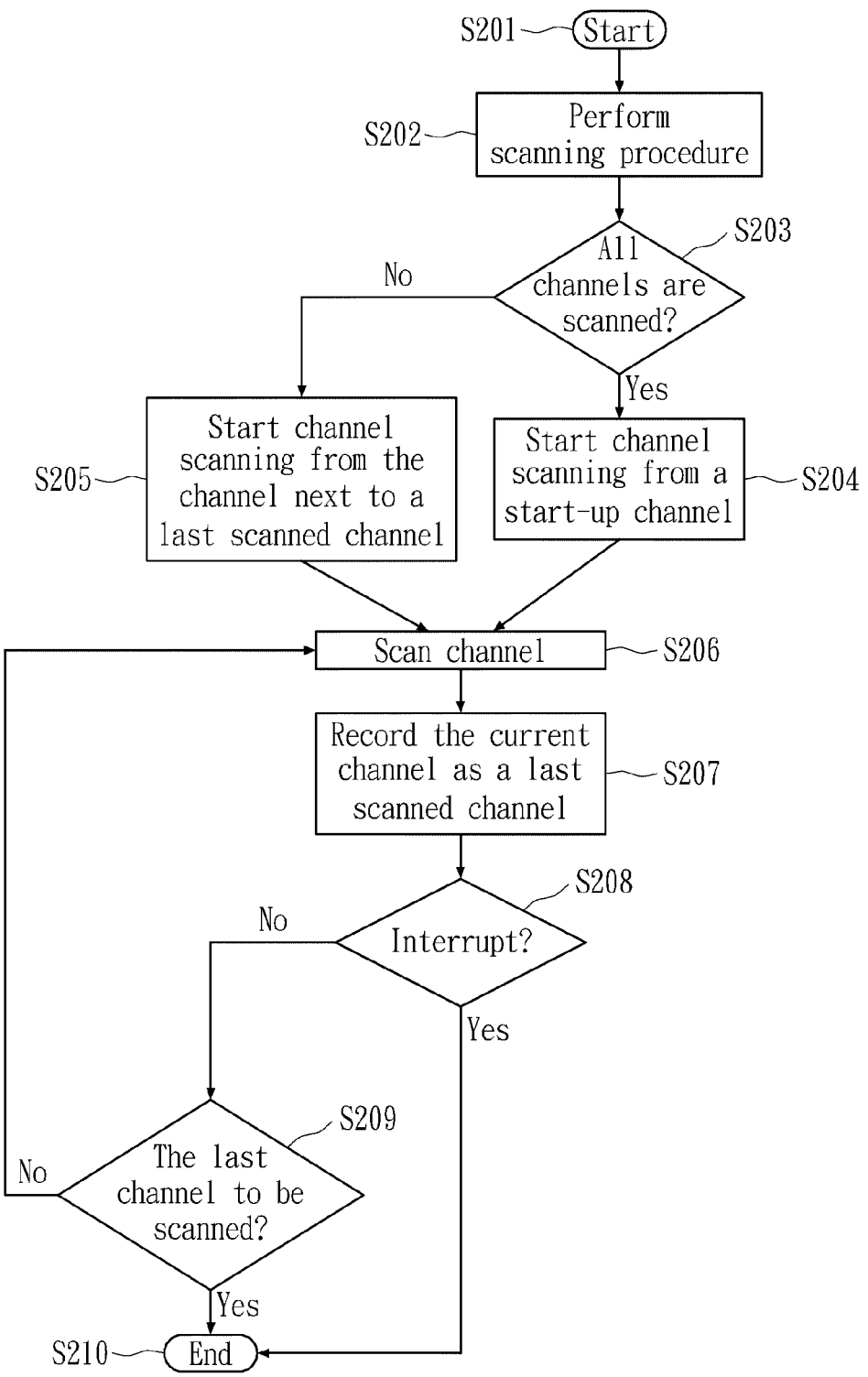
FIG. 2 is a flowchart illustrating the preferred embodiment of the method for scanning channels progressively in accordance with the present invention.

FIG. 2 is a flowchart illustrating the preferred embodiment of the method for scanning channels progressively. In step S201, a station issues a scan request to start a channel scanning procedure. In step S202, the station performs channel scanning operations and records the results of the channel scanning operations in a channel scanning record. According to the IEEE 802.11 standard, the scanning phase scans all channels in order to determine which channels a station can utilize. The two currently available modes for scanning are active scanning and passive scanning. For active scanning, a station selects a channel and sends a broadcast probe request frame and then waits a predetermined period of time. If no "probe response" is transmitted by the AP(s) in response to the probe request within the predetermined period of time, the station selects a next channel and repeats the procedure. For passive scanning, a station simply goes to the channel of interest and passively listens for the periodic beacon frames, if any, sent out by AP(s). If no periodic beacon frame is transmitted by the AP(s) within a predetermined period of time, the station selects a next channel and repeats the passive scanning operation. Step S203 determines whether all channels the station could operate on have been scanned. For example, if the station is a dual-band station which could operate on 38 different channels, step S203 checks whether the 38 different channels have been scanned. If all the 38 different channels have been scanned, an instruction of scanning from a start-up channel (for example, channel 1) is obtained in step S204. The start-up channel of the station depends on the frequency the station utilizes and user settings. The start-up channels for 2.4 GHz stations and 5 GHz stations might, for example, be channel 1 and channel 36 respectively. If only some channels are scanned (for example, only channels 1-108 are scanned and the station can operate on channels 1-14, 36, 40, 44, 48, 52, 56, 60, 64, 100, 104, 108, 112, 116, 120, 124, 128, 132, 136, 140, 149, 153, 157, 161, and 165) in step S202, the channel (i.e. channel 112) next to the last scanned channel (channel 108) which was scanned last in the previous channel scanning operations is designated to scan in step S205. The channel 112 is scanned in step S206.

Figure 3:
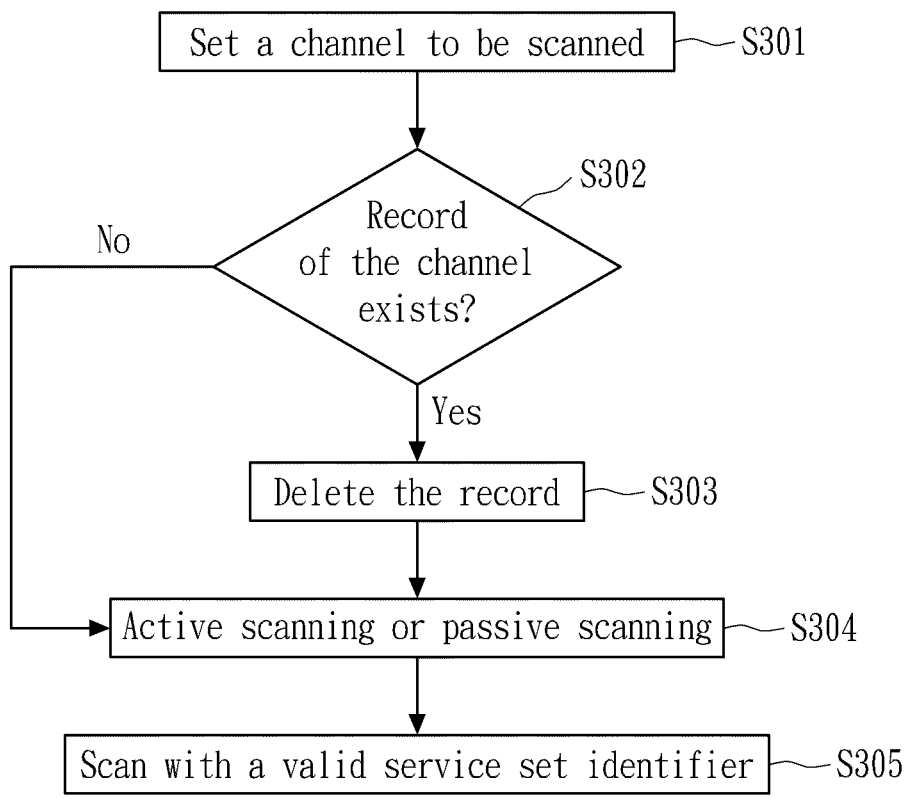
FIG. 3 shows detailed steps of step S206 in FIG. 2.

FIG. 3 shows the details of step S206 in FIG. 2. In step S301, a channel to be scanned is set (for example, the above-mentioned channel 112). Step S302 checks whether the channel scanning record includes the scanning record of the channel 112, which can be any AP operates on channel 112). If the channel scanning record does include the scanning record of channel 112, the scanning record of channel 112 is deleted in step S303. The scanning record includes the information of the APs which operate on channel 112. If the channel scanning record does not include the scanning record of channel 112, then channel 112 is scanned with an active scanning operation or a passive scanning operation. However, if an AP is a hidden AP, an active scanning operation with a valid service set identifier is utilized to obtain the information of the hidden AP. Thus, the station performs an active scanning operation with the valid service set identifier, such as a last-recently SSID set by Windows XP, in step S305.

In step S207, channel 112 is recorded as a last scanned channel. Step S208 determines whether the progressive channel scanning procedure has been interrupted. Persons skilled in the art realize that the interruption may be issued by the operating system or caused by a user at any time. If an interruption occurs, the progressive channel scanning procedure is stopped. If the procedure has not been interrupted, a next channel to be scanned is checked in step S209 to determine whether it is the last channel to be scanned. If it is not the last channel to be scanned, the next channel to be scanned is scanned in step S206. If it is the last channel to be scanned, the progressive channel scanning procedure is ended in step S210. As stated above, the progressive channel scanning procedure of the present invention can be utilized to solve the problem caused by the fixed scanning time of an operation system and deletions of all scanning records before scanning. In addition, the station performing the active scanning operation with the valid service set identifier, which increases the possibility of obtaining the information of hidden APs.

In addition to the above-mentioned progressive channel scanning method, an apparatus for scanning channels progressively in accordance with another embodiment is described as follows to enable those skilled in the art to practice the present invention.

Figure 4:
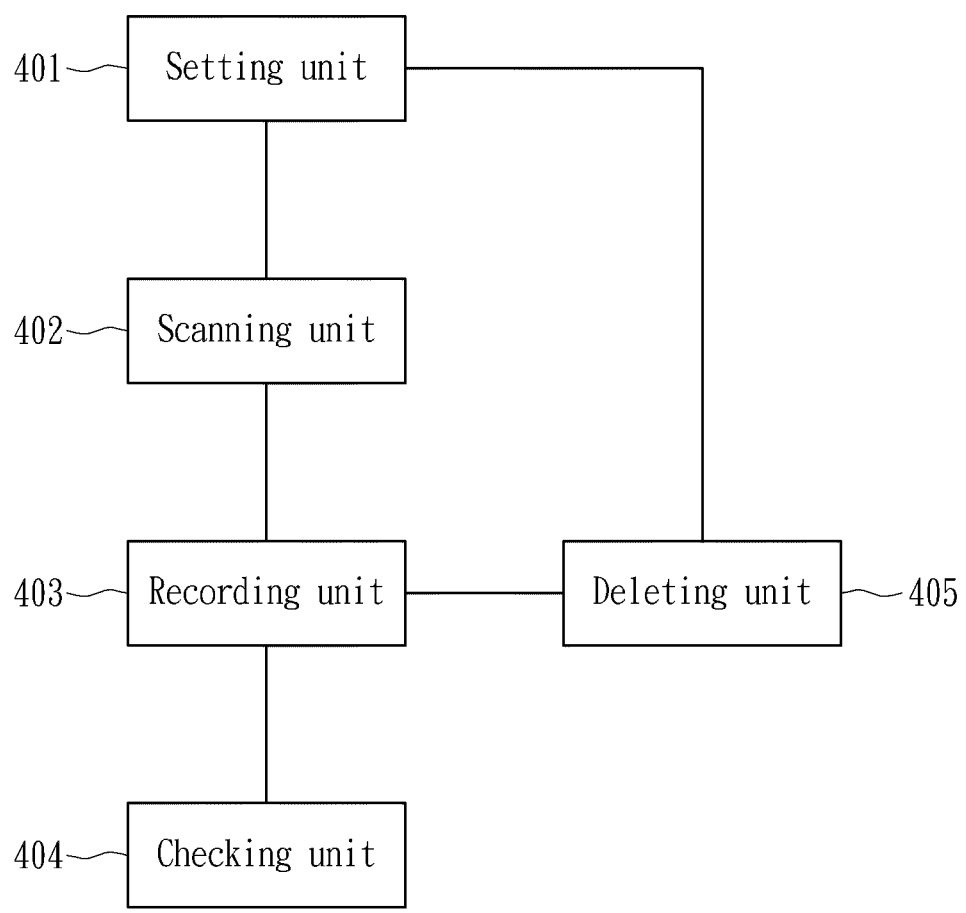
FIG. 4 is a block diagram of the apparatus for scanning channels progressively in accordance with another embodiment of the present invention.

FIG. 4 is a block diagram of the apparatus for scanning channels progressively in accordance with another embodiment of the present invention. The progressive channel scanning apparatus 400 comprises a setting unit 401, a scanning unit 402, a recording unit 403, a checking unit 404 and a deleting unit 405. The setting unit 401 is utilized for setting a channel which will be scanned. The scanning unit 402 is utilized for scanning the channel which will be scanned. The scanning unit 402 is also set in active scanning mode or passive scanning mode for scanning channels. If an AP is a hidden AP, an active scanning operation with a valid service set identifier has to be utilized to obtain the information of the hidden AP. Therefore, the scanning unit 402 performs active scanning operations with the valid service set identifier to scan the channel which will be scanned. The recording unit 403 is utilized to record at least one scanning result of the scanning unit 402 in a channel scanning record and to record the channel which will be scanned as a last scanned channel. The checking unit 404 is utilized to check the recording unit 403 and then determine a next channel to be scanned. For 2.4 GHz stations the next channel is channel K+1, where the above-mentioned channel being scanned is channel K. For 5 GHz stations the next channel is channel K+4 or a channel that the 5 GHz station can operate. The deleting unit 405 is utilized to delete the scanning result of the channel to be scanned in the channel scanning record, wherein the scanning result is obtained from the previous scanning operation for the channel to be scanned. For example, if channel 112 is set by the setting unit 401 as a channel to be scanned and the channel scanning record includes the scanning results of channel 112 obtained from the previous scanning operation, the scanning results of channel 112 obtained from the previous scanning operation deleted before scanning channel 112. The above-mentioned progressive channel scanning apparatus 400 can be implemented with software or hardware and any of a platform with single processor and a platform with multiple processors.

In summary, the progressive channel scanning method and apparatus in accordance with the invention first checks whether all channel scanning tasks have been done. If they have, the progressive channel scanning procedure is started from a start-up channel. Before scanning a channel, the scanning result of the channel in a channel scanning record is deleted, wherein the scanning result is obtained from the previous scanning operation for the channel. During the scanning process, a channel is recorded as a last scanned channel after completing a channel scanning task for the channel. If only some channel scanning tasks are completed in the previous channel scanning procedure, the apparatus continuously scans channels from the channel next to the last scanned channel. In addition, the method and apparatus scan a channel with a valid service set identifier to increase the possibility of detecting hidden APs.

The above-described embodiments of the present invention are intended to be illustrative only. Numerous alternative embodiments may be devised by persons skilled in the art without departing from the scope of the following claims.

What is claimed is:

1. A method for progressively scanning channels comprising the steps of:
   checking whether a previous channel scanning procedure is completed and obtaining a scanning instruction;
   setting a channel to be continuously scanned after the previous channel scanning procedure in accordance with the scanning instruction, wherein the channel to be continuously scanned is a channel next to a last scanned channel in the previous channel scanning procedure if the scanning instruction indicates that the previous channel scanning procedure is not completed;
   deleting only a record of the channel to be continuously scanned if the record of the channel to be continuously scanned is recorded in a scanning record; and
   scanning the channel to be continuously scanned after deleting the record of the channel to be continuously scanned.

2. The method of claim 1, further comprising a step of performing an active scanning operation with a valid service set identifier to scan the channel to be continuously scanned.

3. The method of claim 1, further comprising a step of recording the channel to be continuously scanned as the last scanned channel.

4. The method of claim 1, wherein the last channel is a K-th channel of N channels, K, N being positive integers.

5. The method of claim 4, wherein the N channels to be scanned are channels on which a station operates.

6. The method of claim 4, wherein the next channel for 2.4 GHz stations is channel K+1 and the next channel for 5 GHz stations is channel K+4 or a next channel on which the 5 GHz station operates.

7. The method of claim 1, wherein an active scanning operation is utilized for scanning the channel to be continuously scanned.

8. The method of claim 1, wherein a passive scanning operation is utilized for scanning the channel to be continuously scanned.

9. An apparatus for scanning channels progressively, comprising:
   - a checking unit configured to check at least one result in a recording unit and obtaining a scanning instruction indicating whether a previous channel scanning procedure is completed;
   - a setting unit configured to set a channel to be continuously scanned after the previous channel scanning procedure in accordance with the scanning instruction, wherein the channel to be continuously scanned is a channel next to a last scanned channel in the previous channel scanning procedure if the scanning instruction indicates that the previous channel scanning procedure is not completed;
   - a deleting unit for deleting only a scanning result of the channel to be continuously scanned from the recording unit, wherein, the scanning result is obtained from the previous channel scanning procedure;
   - a scanning unit configured to scan the channel to be continuously scanned after deleting the scanning result of the channel to be continuously scanned; and
   - the recording unit configured to record at least one scanning result from the scanning unit in a scanning record and to record the channel to be continuously scanned as the last scanned channel.

10. The apparatus of claim 9, wherein the scanning unit performs an active scanning operation with a valid service set identifier to scan the channel to be continuously scanned.

11. The apparatus of claim 9, wherein an active scanning mode is set for the scanning unit.

12. The apparatus of claim 9, wherein a passive scanning mode is set for the scanning unit.

13. The apparatus of claim 9, which is implemented with software, hardware, or a platform with single processor or with multiple processors.

* * * * *